Jan. 23, 1940.　　　　M. BRUSTOWSKY　　　　2,187,801
DEVICE FOR SCRAPING THE KNIVES OF SLICING MACHINES
Filed Jan. 5, 1938　　　　2 Sheets-Sheet 1
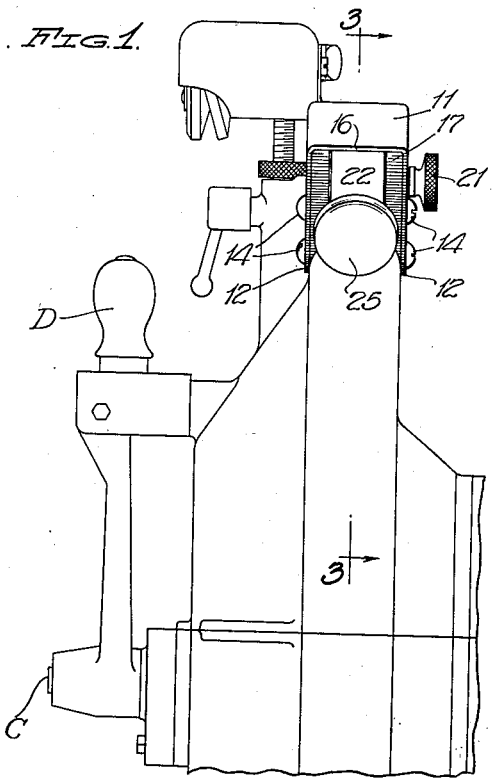
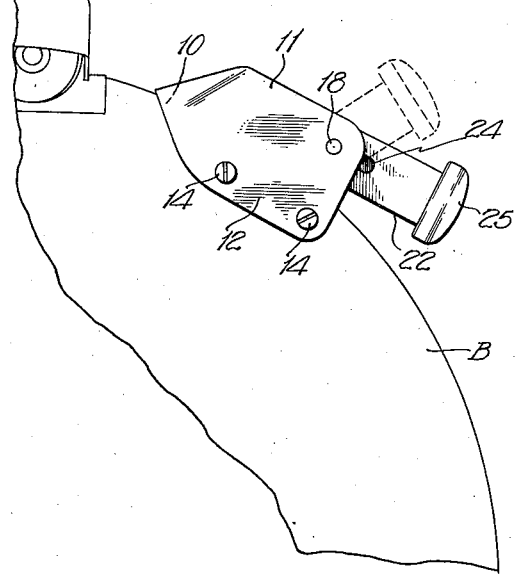
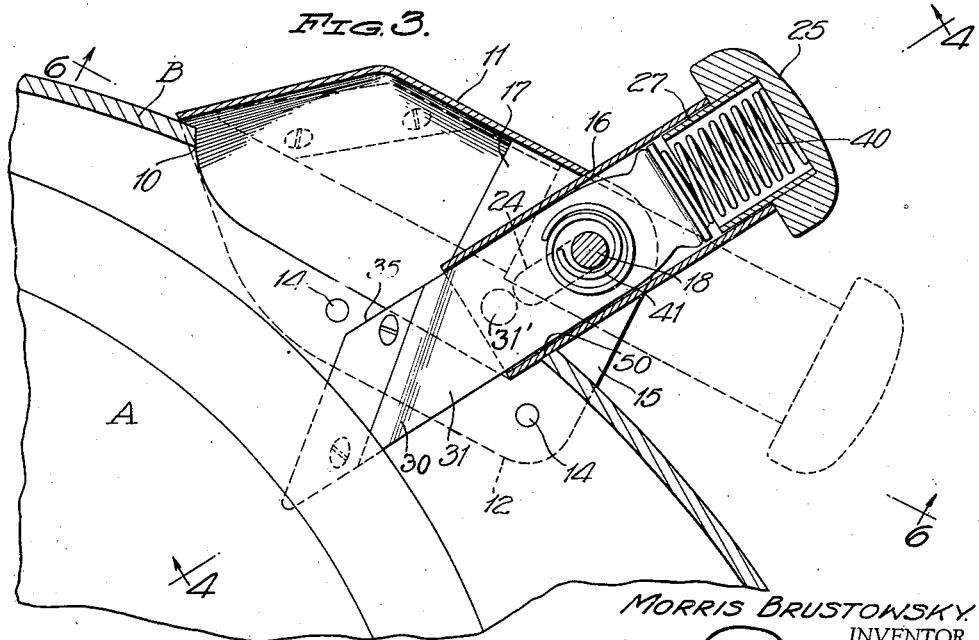
MORRIS BRUSTOWSKY.
INVENTOR.
BY Ely Pattison
ATTORNEYS.

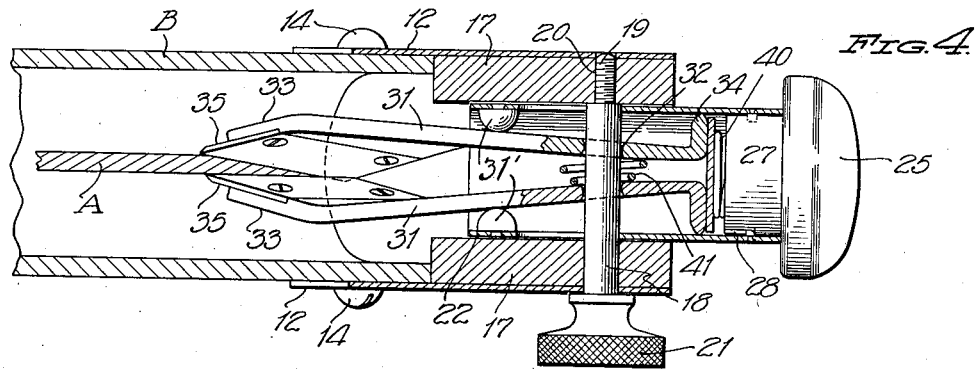
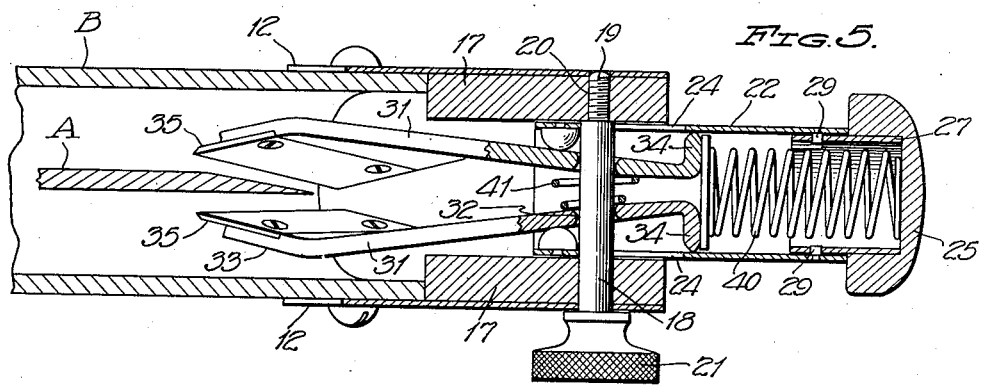
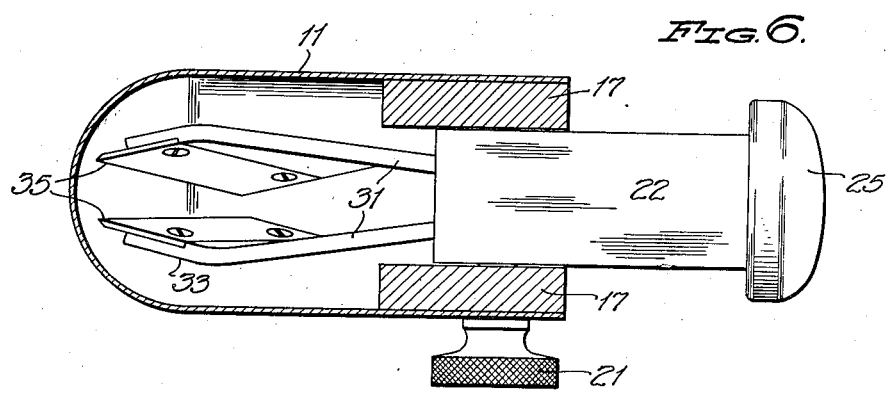
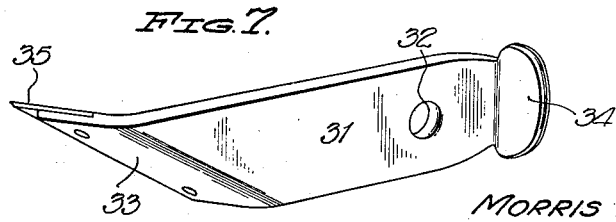

Patented Jan. 23, 1940

2,187,801

UNITED STATES PATENT OFFICE 2,187,801

DEVICE FOR SCRAPING THE KNIVES OF SLICING MACHINES

Morris Brustowsky, Brooklyn, N. Y.

Application January 5, 1938, Serial No. 183,449

10 Claims. (Cl. 146—101)

This invention relates to new and useful improvements in slicing machines of the type which employ rotary knives, and more particularly it pertains to a device for scraping the blades of such machines to remove any particles which may adhere thereto after a cutting operation.

In machines of the afore-mentioned type, and especially those employed in the slicing or cutting of loaves of bread, small pieces of the material being cut adhere to the knife and unless removed, accumulate thereon. This accumulation, if not removed, results not only in an unsanitary condition of the knife, but seriously interferes with the proper operation thereof.

It is the object of the present invention to provide new and novel means whereby the small particles adhering to the knife after a cutting operation, may be removed thus insuring not only a sanitary condition of the knife, but also insuring efficient operation thereof.

Slicing machines of the type which employ a rotary knife of the disk type, also employ a guard in the form of a housing which encloses the knife and a feature of this invention resides in the provision of a scraping device which is carried by said guard and which although normally out of operative relation with respect to the knife of the slicing machine, may be moved at will into operative engagement with the knife to perform a scraping operation thereon.

A further feature of the invention resides in a novel construction whereby, although the scraping device is movable manually into scraping engagement with the knife, the scraping device will be automatically moved to its inoperative position upon release thereof by the operator.

Still a further feature of the invention resides in the provision of two scraping elements arranged one upon each side of the knife, the scraping elements being so mounted as to be movable manually into scraping engagement with the knife and automatically out of engagement with the knife when released by the operator.

Still another feature of the invention resides in a novel method of mounting of the scraping elements so that they have what may be termed floating movement which permits of independent yielding engagement of the scraping elements with the knife.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings:

Figure 1 is a fragmentary edge view in elevation illustrating the upper portion of a guard for the knife of a slicing machine of the rotary disk knife type illustrating a device constructed in accordance with the present invention, attached thereto, Figure 2 is a fragmentary view in side elevation thereof, Figure 3 is a sectional view on an enlarged scale, the view being taken substantially on a line 3—3 of Figure 1, Figure 4 is a detail sectional view taken substantially on the line 4—4 of Figure 3, the view showing the scraping elements in scraping engagement with the knife, Figure 5 is a view similar to Figure 4, showing the scraping elements disengaged with respect to the knives, Figure 6 is a top plan view partly in section illustrating the scraping device, and Figure 7 is a perspective view of one of the scraping elements.

Referring to the drawings by reference character, A designates the knife of a slicing machine and B designates the guard therefor. The knife A is mounted upon a shaft C, which shaft has an operating handle D by which it may be manually rotated, all in the conventional manner.

The guard B is provided with an opening 10 and enclosing said opening 10, there is a housing 11. The housing 11, has side flanges 12 depending therefrom around the sides of the guard B and passing through these flanges, there are screws or the like 14 which have threaded engagement with internally threaded recesses in the guard B to secure the housing 11 in place thereon. The housing 11, has an open end 15 and its top wall terminates short of the adjacent ends of the side walls of the housing as indicated at 16 in Figure 3. As best illustrated in Figures 4, 5 and 6, there are two bearing blocks 17 upon the interior of the housing 11, these bearing blocks 17 being suitably secured to the inner faces of the side walls of said housing.

Extending across the housing 11, there is a shaft 18. The shaft 18 slides freely through an opening in one of the bearing blocks 17, and has a screw-threaded end 19 for threaded engagement with a screw threaded recess 20 in the other bearing block 17. By this means, the shaft 18 is secured in the housing 11, it being turned up to its operative position by means of an operating head 21.

The reference numeral 22 designates a second housing which is mounted upon the shaft 18 in such a manner as to have both a pivotal and a sliding movement relative to said shaft and to the housing 11. As best illustrated in Figure 6, this second housing extends into the open end 15 of the housing 11, when it is in its operative position therein.

The side walls of the second housing 22 are each provided with a slot 24, the width of which is substantially equal to the diameter of the shaft 18, and these slots 24 provide the means for pivotally and slidingly mounting the housing 22 within the housing 11.

The outer end of the second housing 22 is closed by a cap 25 in the form of an overbalancing element of sufficient weight to rock downwardly, the housing 22 and its associated parts in a manner and for a purpose to be hereinafter more specifically set forth. The cap 25 performs the function of an operating member for the housing 22 and it is removably secured in the end of the housing 22 by means of a tubular member 27 which has two diametrically opposed bayonet slots 28 for reception of pins 29 projecting inwardly from the side walls of the housing 22 as best illustrated in Figure 5.

Adjacent the opposite end of housing 22 from top 25 and on the same sides of the housing having slots 24 are located inwardly projecting opposed lugs 31' which have sliding contact with the outer sufaces of member 31.

The reference character 30 designates the scraping elements of which there are two. These scraping elements are arranged one upon each side of the knife A, and are adapted to be moved into and out of engagement therewith in a manner to be hereinafter more specifically described.

Each scraping element comprises a main body portion 31 having an opening 32 therethrough, and two offset ends 33 and 34. The openings 32 in the scraping elements provide the means for mounting the scraping elements upon the shaft 18, and as illustrated in Figure 5, these openings have rounded side walls and are slightly larger than the diameter of the shaft 18, which construction provides for a pivotal, sliding and slight rocking movement of the scraping elements upon the shaft 18. In fact, the scraping elements might be said to have a floating movement upon the shaft 18.

The angular end 33 of each scraping element has removably secured thereto, a scraping blade 35 while the offset end 34 is so shaped to provide a head, for a purpose to be hereinafter described.

The scraping elements are mounted upon the shaft 18 with their off-set ends within the housing 22, and interposed between the off-set ends 34 of the scraping elements and the cap 25, there is a compression spring 40 which operates to force forwardly at all times the scraping elements.

Means is also provided for normally spreading the scraping elements thus to maintain them normally out of engagement with the knife A and this means comprises a coil spring 41 surrounding the shaft 18 and interposed between the scraping elements as best illustrated in Figures 5 and 6.

The device operates in the following manner:

In Figure 3 of the drawings, the device is shown in dotted lines, in its inoperative position which is the normal position of the parts. The parts are retained normally in the dotted line position by means of the overbalancing effect of the weighted cap 25 and the compression spring 40. In the normal position, the knife engaging portions of the scraping elements are elevated to a position within the housing 11, in which position they are out of the path of the knife A, of the slicing machine.

To position the scrapers upon opposite sides of the knife A, but not in scraping engagement therewith, in which position they are shown in Figure 5 of the drawings, the weighted operating member is grasped and moved upwardly, rocking the housing 22 about the shaft 18 and moving the scraping elements downwardly to position where they straddle the edge portion of the knife A. The housing 22 reaches its proper position when its top wall engages the end 16 of the top wall of the housing 11 and its lower wall engages the adjacent end of the opening 10 as indicated at 50 in Figure 3 of the drawings.

Being mounted upon the shaft 18 and being held in engagement with the top wall of the housing 11 and the end of the slot 10 in the guard B, the device may be firmly and rigidly held in operative position.

To move the scraping elements into operative engagement with the knife A, the weighted operating member is depressed against the action of the spring 40 and this action slides the housing 22 upon the shaft 18. By reason of the shape of the main body portion of the scraping elements, they are angularly disposed with respect to the side walls of the housing 22 and this angular relation between these parts, together with lugs 31' on member 22 effects a squeezing together of the scraping elements against the action of the spring 41, into scraping engagement with their respective sides of the knife A.

By reason of the floating action of the scraping elements heretofore mentioned, the scraping elements are capable of movement independently of each other and this independent movement of the scraping elements, permits each element to adjust itself to such position that the scraping edge of its scraping blade will engage its respective side of the knife A, at the proper scraping angle.

The scraping blades of the scraping elements are shown in scraping engagement with the knife A in Figure 4 of the drawings and it is to be understood that they are maintained in this position by pressure exerted upon the weighted head 25 by the operator, generally by his right hand although this may vary in installations upon machines of a type different from the one herein disclosed.

To effect the scraping operation, with the scraping elements held in engagement with the knife A as just described, the handle D is operated in the conventional manner employed to sharpen a slicing machine knife and the knife is rotated by hand, it being understood that while the knife is being so rotated, the scraping elements are maintained in scraping engagement with the knife.

After the scraping operation has been completed, the operator's hand is removed from the weighted head 25 which relieves the pressure thereon and permits the parts to return to their normal position in the manner to be now described.

When pressure is relieved from the weighted operating head 25, the spring 40 forces the housing 22 outwardly, or to the right in Figure 5, which action permits the spring 41 to spread the scraping elements, moving them out of engagement with the knife A, in which position they are shown in Figure 5. Simultaneously with the above operations, the housing 22 rocks downwardly under the influence of gravity, to the dotted line position in which it is shown in Figure 3. Obviously, as the housing 22 rocks downwardly, the scraping elements are elevated to position in the housing 11 as illustrated in dotted lines in Figure 3 and in which position it is entirely removed from the operating field of the knife A.

From the foregoing, it will be apparent that the present invention provides a novel mechanism for scraping clean the knife of a rotary knife slicing machine, which scraping device is in the nature of an accessory to the machine, which is permanently carried by the machine, is automatically held out of operative relation with the knife of the machine and yet, is so mounted as to be moved at will, into operative position to perform a scraping operation upon the knife of the machine.

It is to be understood that the herein embodiment of the invention is by way of illustration only and that the invention is capable of such other embodiments as may fall within the scope of the appended claims.

Having thus described the invention, what is claimed as new, is:

1. A scraping device for the knives of slicing machines of the type which employ a rotating knife and a guard therefor, said scraping device comprising a housing for closing an opening in the knife guard, a second housing mounted for pivotal and sliding movement relatively to the first mentioned housing, a plurality of scraping elements pivotally mounted in the first mentioned housing and movable about their pivotal point into juxta-position with the knife of the slicing machine, and means carried by the second mentioned housing for moving the scraping elements into scraping engagement with the knife of the slicing machine.

2. A scraping device for the knives of slicing machines of the type which employ a rotating knife and a guard therefor, said scraping device comprising a housing for enclosing an opening in the knife guard, a second housing mounted for pivotal and sliding movement relatively to the first mentioned housing, and a plurality of scraping elements pivotally mounted in the first mentioned housing and movable about their pivotal point upon pivotal movement of the second mentioned housing into juxta-position with the knife of the slicing machine, and into scraping engagement with said knife upon sliding movement of the second mentioned housing relative to the first mentioned housing.

3. A scraping device for the knives of slicing machines of the type which employ a rotating knife and a guard therefor, said scraping device comprising a housing for enclosing an opening in the knife guard, a shaft extending transversely of the housing, a plurality of scraping elements pivotally and slidably mounted upon said shaft, and a second housing pivotally and slidably mounted upon said shaft and having operative engagement with said scraping elements whereby to rock them about their pivotal point into juxta-position with the knife of the slicing machine upon pivotal movement of the second mentioned housing and into scraping engagement with the slicing machine knife upon sliding movement of the second mentioned housing.

4. A scraping device for the knives of slicing machines of the type which employ a rotating knife and a guard therefor, said scraping device comprising a housing for enclosing an opening in the knife guard, a shaft extending through the housing, a plurality of scraping elements mounted upon said shaft and having independent sliding and pivotal movement thereon, and a second housing pivotally and slidably mounted upon said shaft, said second mentioned housing enclosing adjacent ends of said scraping elements and operatively connected therewith to rock them about their pivotal point into juxta-position with the knife of the slicing machine upon pivotal movement of the second mentioned housing and into scraping engagement with the knife of the slicing machine upon sliding movement of the second mentioned housing.

5. A scraping device for the knives of slicing machines of the type which employ a rotating knife and a guard therefor, said scraping device comprising a housing for enclosing an opening in the knife guard, a shaft extending through the housing, a plurality of scraping elements mounted upon said shaft and having independent sliding and pivotal movement thereon, a second housing pivotally and slidably mounted upon said shaft and having operative engagement with said scraping elements whereby to rock them about their pivotal point into juxta-position with the knife of the slicing machine upon pivotal movement in one direction of the second mentioned housing, and into scraping engagement with the slicing machine knife upon sliding movement of the second mentioned housing, and means for holding said scraping elements normally out of juxta-position with the slicing machine knife.

6. A scraping device for the knives of slicing machines of the type which employ a rotating knife and a guard therefor, said scraping device comprising a housing for enclosing an opening in the knife guard, a shaft extending through the housing, a plurality of scraping elements mounted upon said shaft and having independent sliding and pivotal movement thereon, a second housing pivotally and slidably mounted upon said shaft and having operative engagement with said scraping elements whereby to rock them about their pivotal point into juxta-position with the knife of the slicing machine upon pivotal movement in one direction of the second mentioned housing, and into scraping engagement with the slicing machine knife upon sliding movement of the second mentioned housing, and gravity operated means for holding said scraping elements normally out of juxta-position with the slicing machine knife.

7. A scraping device for the knives of slicing machines of the type which employ a rotating knife and a guard therefor, said scraping device comprising a housing for enclosing an opening in the knife guard, a shaft extending through the housing, a plurality of scraping elements mounted upon said shaft and having independent sliding and pivotal movement thereon, a second housing pivotally and slidably mounted upon said shaft and having operative engagement with said scraping elements whereby to rock them about their pivotal point into juxta-position with the knife of the slicing machine upon pivotal movement in one direction of the second mentioned housing, and into scraping engagement with the slicing machine knife upon sliding movement of the second mentioned housing, gravity operated means for holding said scraping elements normally out of juxta-position with the slicing machine knife and resilient means for holding said scraping elements normally out of scraping engagement with the slicing machine knife.

8. A scraping device for the knives of slicing machines of the type which employ a rotating knife and a guard therefor, said scraping device comprising a housing for enclosing an opening in the knife guard, a shaft extending through the housing, a plurality of scraping elements mounted upon said shaft and having independent sliding and pivotal movement thereon, a second housing pivotally and slidably mounted upon said shaft and having operative engagement with said scraping elements whereby to rock them about their pivotal point into juxta-position with the knife of the slicing machine upon pivotal movement in one direction of the second mentioned housing, and into scraping engagement with the slicing machine knife upon sliding movement of the second mentioned housing, and resilient means for holding said scraping elements normally out of scraping engagement with the slicing machine knife.

9. A scraping device for the knives of slicing machines of the type which employ a rotating knife and a guard therefor, a housing for enclosing an opening in the guard, a shaft extending transversely of the housing, a pair of scraping elements pivotally and slidably mounted upon said shaft, said scraping elements being movable through the opening in the guard into straddling relation with the knife, means for holding said scraping elements out of engagement with the knife even when in straddling relation therewith, and means for moving said scraping elements into engagement with the knife against the action of said last mentioned means.

10. A scraping device for the knives of slicing machines of the type which employ a rotating knife and a guard therefor, said scraping device including means for engagement with the knife, means for pivotally mounting said knife engaging means for movement through an opening in the guard into juxta-position with the knife but out of contact therewith, means for moving the knife engaging means into engagement with the knife when the knife engaging means is in juxta-position to the knife, and gravity actuated means for holding the knife engaging means normally out of juxta-position to the knife.

MORRIS BRUSTOWSKY.